Patented May 26, 1936

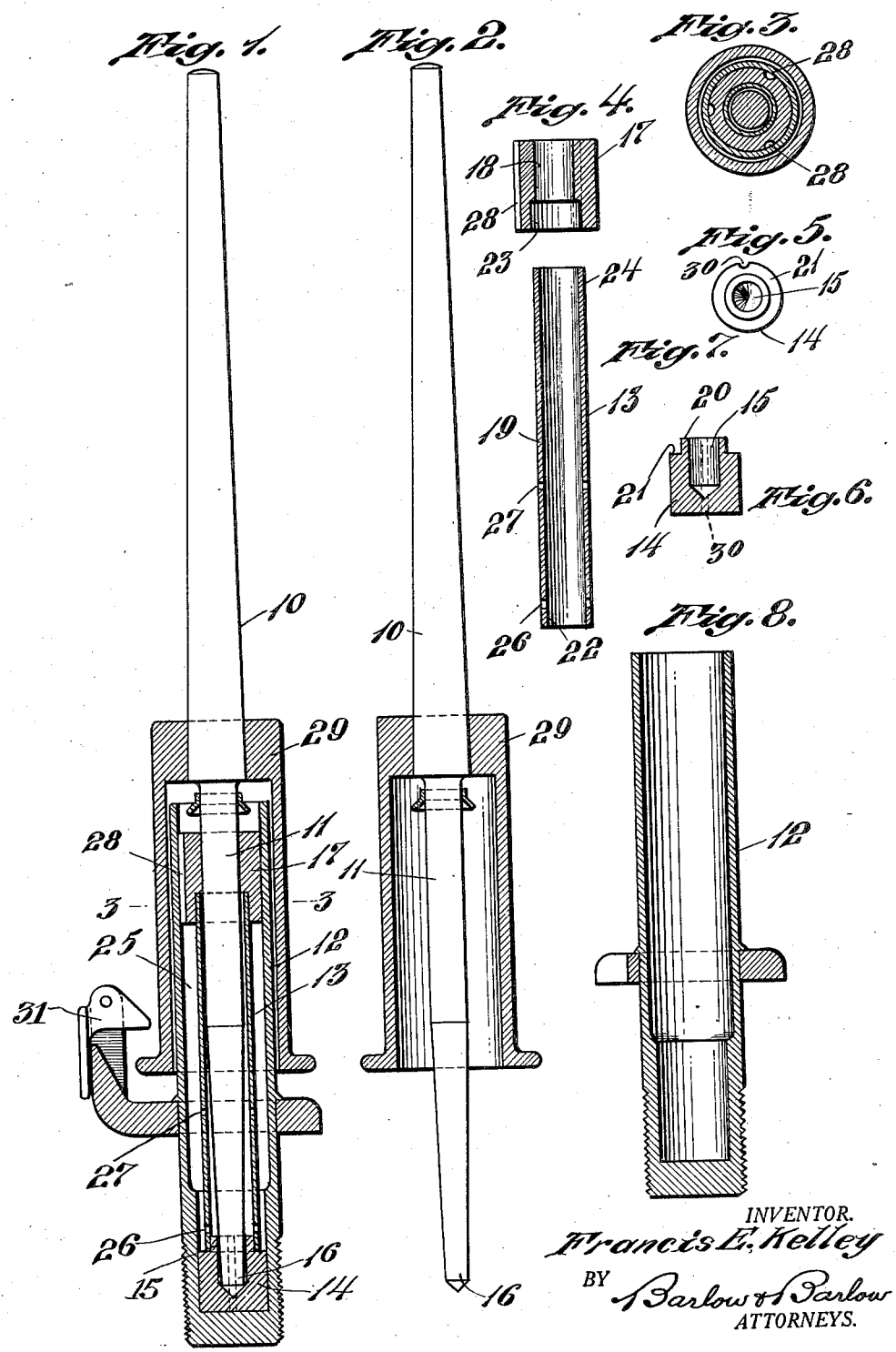
May 26, 1936.  F. E. KELLEY  2,041,934
SPINDLE BEARING
Filed Dec. 24, 1934

2,041,934

UNITED STATES PATENT OFFICE 2,041,934

SPINDLE BEARING

Francis E. Kelley, Providence, R. I., assignor to Easton and Burnham Machine Company, a corporation of Rhode Island Application December 24, 1934, Serial No. 759,033

5 Claims. (Cl. 308—150)

This invention relates to a spindle bearing and the spindle blade which is mounted therein, and has for one of its objects the provision of a spindle having a bearing affording less than the usual frictional resistance to the rotation of the spindle in its bearing and thus a reduction of power necessary for driving a multiplicity of spindles, such as occur on a spinning or drawing frame.

Another object of the invention is to provide a very simple construction which will effect a saving of power comparable favorably with the more complicated ball bearing construction, which is in use at the present time.

Another object of this invention is to use a hardened metal and locate this at the bearing points of the bolster only thereby effecting a saving in construction of the bolster by eliminating the more expensive metal at points where it is not required.

Another object of the invention is the making of the tool steel bearing portions of the bolster separate from each other and then assembling them with a non-tooled steel portion, thus permitting a saving in cost of material and an easier construction of bolster than were the same finished all in one piece of tool steel.

With these and other objects in view, the invention consists of certain novel features of construction, as will be more fully described, and particularly pointed out in the appended claims.

In the accompanying drawing:

Fig. 1 is a sectional view through the spindle mounting;

Fig. 2 shows the spindle with a whorl in section mounted thereon;

Fig. 3 is a section on line 3—3 of Figure 1;

Fig. 4 is a sectional view through the upper bearing of the bolster;

Fig. 5 is an end view of the lower bearing step of the bolster;

Fig. 6 is a sectional view thereof;

Fig. 7 is a sectional view of the shell which connects the upper and lower bearings of the bolster;

Fig. 8 is a sectional view of the bolster casing.

Spindles are usually mounted in a casing having a bolster therein, which provides bearing surfaces for the blade of the spindle. The contacting surfaces are usually of cast iron or bronze, and even though immersed in oil considerable friction is developed between these bolster bearings and the blade requiring considerable power to operate a frame having a multiplicity of these spindles to be driven. This friction is so appreciable that there has appeared on the market ball and roller bearing spindles which materially reduce the power necessary for operation of a frame containing a multiplicity of these spindles. The construction of these ball or roller bearing spindles is, however, sufficiently complicated so that the cost is substantially twice that of a spindle having the usual cast iron or bronze bearing mountings, and I have discovered that by providing the bolster bearings of chrome tool steel and hardening them to a substantially glass hard finish and grinding and polishing the contacting surfaces, I may obtain approximately 18 to 20% power saving by reducing the friction which is developed in the rotation of the blade in its bearing, which figure of saving almost reaches the saving effective by the ball or roller bearing surfaces above mentioned; while the cost of producing this glass hard bearing surface by the particular construction which I have developed and hereinafter described permits this spindle to be sold at substantially one-half the cost of the roller or ball bearing spindle above mentioned; and the following is a more detailed description of the present embodiment of this invention, illustrating the preferred means by which these advantageous results may be accomplished:

With reference to the drawing, 10 designates a spindle having a blade 11 which extends into the bolster casing 12 to engage bearings in a bolster designated generally 13 and consisting of a lower step 14 having a bore 15 to receive the lower end 16 of the blade and a spaced upper bearing 17 having a bore 18 to receive the upper portion of the blade. These bearings are connected by a tubular shell 19 which fits over a collar 20 located about the bore 15 and engages the shoulder 21 located around the collar 20, there being a relatively tight fit between the outer surface of the collar 20 and the inner surface 22 of the tubular shell 19. The upper bearing 17 is provided with a larger bore 23 which is concentric with the bearing 18 and is of a size to receive and tightly fit onto the outer surface 24 of the tubular shell 19 so that the upper bearing 17 and the lower step 14 are assembled as a unit by means of the tubular shell, which unit comprises the bolster.

This bolster is positioned in the bolster casing which is of an internal size to substantially fit the bolster. The fit of the bolster in this casing may be a tight press fit or there may be a play of a few thousandths between the bolster and its casing depending upon whether the spindle is to be used for cotton, silk or rayon. The shell 19 is of a size substantially smaller than the internal diameter of the bore of the casing and leaves an oil reservoir 25 for the storage of a lubricant which may pass through openings such as 26, 27 in the shell and lubricate the bearings at the upper and lower ends of the blade 11. A return opening 28 is provided along the outer surface of the upper bearing 17 to afford a conduit for the circulation of the lubricant. A whorl 29 is mounted on the spindle and envelops the upper portion of the bolster casing, as is clearly shown in Figure 1. A latch 31 serves to retain the whorl in position.

The blade of the spindle, the lower bearing step 14, and the upper bearing 17 are formed of chrome tool steel which is heat treated so as to provide the bearing surfaces substantially glass hard, which surfaces are ground and polished. In the Rockwell C scale of hardness the hardened steel tests approximately No. 60. By the provision of surfaces of this extreme degree of hardness a very unexpected and remarkable reduction of friction occurs between the spindle blade and its bearing when the spindle is rotated, the reduction of friction being from index about one and one-half to index one-half and affords a power saving from 18 to 20% necessary for the rotation of a multiplicity of these spindles in a frame, which saving compares very favorably with the ball or roller type of spindle which has designed to accomplish this power saving, although it is of a much more complicated and expensive construction.

While the bolster could be made all in one piece of this chrome tool steel, I have chosen to make the bolster in three pieces and use the chrome tool steel for the upper and lower bearings and connect the upper and lower bearings by a tubular shell of a less expensive material, inasmuch as this tube has an inner diameter greater than the blade of the spindle and is out of contact with the blade of the spindle at all times, thereby making it unnecessary to use this steel in this location as no friction occurs. The several parts of the bolster may be more efficiently made in the three pieces which I have illustrated and the assembly is very simple for placing them together.

A groove 30 is provided in the bearing step 14 to prevent trapping of air between it and the casing when the bolster is placed therein. The assembly usually takes place by assembly of the parts of the bolster in inverted position from that shown and placing the inverted casing over them and forcing the bolster to its seat in the casing.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a spindle having a blade, a bolster casing, a bolster in said casing providing spaced bearing surfaces for said blade, said bearing surfaces and blade being substantially glass hard polished surfaces to reduce friction resisting rotation of said blade in said bearing.

2. In combination, a spindle having a blade, a bolster casing, a bolster in said casing for rotatably receiving said blade and comprising a lower bearing step having a bore for the reception of the end of the blade, and a collar about said bore with a shoulder outwardly therefrom, an upper bearing having a bore for the reception of the blade and a larger bore concentric therewith extending a short distance into said bearing at one end thereof and a shell fitting over said collar and into said larger bore to connect said step and bearing together.

3. In combination, a spindle having a blade, a bolster casing, a bolster in said casing for rotatably receiving said blade and comprising separate bearings for the blade connected by a shell, said bearings and blade presenting glass hard smooth engaging surfaces.

4. In combination, a spindle having a blade, a bolster casing, a bolster in said casing for rotatably receiving said blade and comprising a lower bearing step, an upper bearing and a tubular shell connecting said bearings together, said bearings and blade presenting glass hard polished engaging surfaces.

5. In combination, a spindle having a blade, a bolster casing, a bolster in said casing for rotatably receiving said blade and comprising a lower bearing step having a bore for the reception of the end of the blade, and a collar about said bore with a shoulder outwardly therefrom, an upper bearing having a bore for the reception of the blade and a larger bore concentric therewith extending a short distance into said bearing at one end thereof and a shell fitting over said collar and into said larger bore to connect said blade bearings together, said bearings being formed of chrome-tool steel, heat treated to provide substantially glass hard blade engaging surfaces.

FRANCIS E. KELLEY.